(12) United States Patent
Nakano et al.

(10) Patent No.: US 12,555,054 B2
(45) Date of Patent: Feb. 17, 2026

(54) PRODUCTION PLANNING DEVICE, PRODUCTION PLANNING SYSTEM, AND PRODUCTION PLANNING METHOD

(71) Applicant: Hitachi, Ltd., Tokyo (JP)

(72) Inventors: Takahiro Nakano, Tokyo (JP); Youichi Nonaka, Tokyo (JP); Daisuke Tsutsumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 104 days.

(21) Appl. No.: 18/570,855

(22) PCT Filed: May 19, 2022

(86) PCT No.: PCT/JP2022/020837
§ 371 (c)(1),
(2) Date: Dec. 15, 2023

(87) PCT Pub. No.: WO2023/007916
PCT Pub. Date: Feb. 2, 2023

(65) Prior Publication Data
US 2024/0281733 A1 Aug. 22, 2024

(30) Foreign Application Priority Data
Jul. 30, 2021 (JP) .................... 2021-125953

(51) Int. Cl.
*G06Q 10/0631* (2023.01)
(52) U.S. Cl.
CPC .............. *G06Q 10/06312* (2013.01)
(58) Field of Classification Search
CPC .......... G06Q 50/04; Y02P 90/02; G05B 19/00
See application file for complete search history.

(56) References Cited

U.S. PATENT DOCUMENTS

2015/0261216 A1 9/2015 Yasuma et al.
2018/0364674 A1* 12/2018 Kapila .................. G05B 19/00

FOREIGN PATENT DOCUMENTS

JP     04-176545 A    6/1992
JP    2013-186866 A   9/2013
(Continued)

OTHER PUBLICATIONS

Zhao, Jing-ying. "Evaluation index system of production planning in manufacturing enterprise." IE&EM 2019: Proceedings of the 25th International Conference on Industrial Engineering and Engineering Management 2019. Singapore: Springer Singapore, 2020. (Year: 2020).*

(Continued)

*Primary Examiner* — Emmett K. Walsh
(74) *Attorney, Agent, or Firm* — Volpe Koenig

(57) ABSTRACT

It is possible to update a process plan, a work plan, and a production plan in a short time with respect to a production fluctuation event and flexibly deal with the production fluctuation. A production planning device includes: a process plan generation unit which generates a plurality of process plans including an alternative process plan, the process plans relating to a production process of a product; a work plan generation unit which generates a work plan corresponding to each of the process plans; a production plan generation unit which generates a production plan using the plurality of process plans and the work plan; and a production plan redrafting unit which redrafts a production plan using the plurality of process plans and the work plan when a production fluctuation event occurs.

15 Claims, 14 Drawing Sheets

(56) References Cited

FOREIGN PATENT DOCUMENTS

| | | |
|---|---|---|
| JP | 2015-176239 A | 10/2015 |
| JP | 2019-032819 A | 2/2019 |
| JP | 2020-098541 A | 6/2020 |

OTHER PUBLICATIONS

International Search Report, PCT/JP2022/020837, Aug. 9, 2022, 2 pgs.

* cited by examiner

FIG. 2

PRODUCTION PERFORMANCE INFORMATION 121

| PRODUCT ID | COMPONENT ID | PROCESS ID | PRODUCTION RESOURCE ID | DATE AND TIME | START TIME | END TIME |
|---|---|---|---|---|---|---|
| 08AAC01 | 08AAC01-10B | 13 | 402 | 2020/3/20 | 5:30 | 6:10 |
| 08ABA03 | 08AAC01-30A | 4 | 201 | 2020/3/20 | 5:40 | 5:50 |
| 08ABC01 | 08ABC01-01C | 3 | 180 | 2020/3/20 | 5:40 | 6:00 |
| 08ABA03 | 08ABA03-34B | 5 | 160 | 2020/3/20 | 5:50 | 6:20 |
| 08ABA05 | 08ABA05-41C | 5 | 161 | 2020/3/20 | 5:50 | 6:20 |

COMPONENT SHAPE INFORMATION 123

| COMPONENT ID | COMPONENT NAME | SHAPE CHARACTERISTIC | WIDTH (mm) | LENGTH (mm) | DIAMETER (mm) | WEIGHT (kg) |
|---|---|---|---|---|---|---|
| 08AAC01-10B | * * * * * * | CYLINDER | * * | * * | * * | * * |
| 08AAC01-30A | * * * * * * | RECTANGLE | * * | * * | * * | * * |
| 08ABC01-01C | * * * * * * | COLUMN | * * | * * | * * | * * |

PRODUCTION QUANTITY INFORMATION 124

| PRODUCT ID | MONTHLY PRODUCTION QUANTITY ||||||| |
|---|---|---|---|---|---|---|---|---|
| | 2020 ||||||| |
| | APRIL | MAY | JUNE | JULY | AUGUST | SEPTEMBER | OCTOBER | |
| 08AAC 01 | 8 | 5 | 13 | 55 | 12 | 20 | 10 | ... |
| 08AAC 02 | 5 | 10 | 14 | 10 | 11 | 30 | 14 | |
| 08AAC 03 | 10 | 11 | 16 | 20 | 23 | 10 | 15 | |

124a — PRODUCT ID column
124b — MONTHLY PRODUCTION QUANTITY columns

FACTORY LAYOUT INFORMATION 125

FIG. 8

WORK PLAN 222

| WORK ID | WORK PLAN ID | WORK TIME [sec] |
|---------|--------------|-----------------|
| C0031   | 0110         | 17              |
| C0032   | 0210         | 22              |
| C0033   | 0220         | 010             |

FIG. 9

PRODUCTION PLAN 223

| PRODUCT ID | COMPONENT ID | PROCESS ID | PRODUCTION RESOURCE ID | DATE AND TIME | SCHEDULED START TIME | SCHEDULED END TIME |
|---|---|---|---|---|---|---|
| 223a | 223b | 223c | 223d | 223e | 223f | 223g |
| 08AA B03 | 08AA B03-14B | 6 | 0153 | 2020/6/15 | 10:20 | 10:30 |
| 08AA C01 | 08AA C01-03A | 3 | 0340 | 2020/6/15 | 10:40 | 11:00 |
| 08AA A010 | 08AA A010-31D | 1 | 0140 | 2020/6/15 | 10:53 | 11:10 |
| 08AA B01 | 08AA B01-41B | 15 | 0150 | 2020/6/15 | 11:00 | 11:40 |
| 08AB A10 | 08AB A10-11A | 11 | 0220 | 2020/6/15 | 11:10 | 12:00 |

PRODUCTION PLANNING DEVICE, PRODUCTION PLANNING SYSTEM, AND PRODUCTION PLANNING METHOD

TECHNICAL FIELD

The present invention relates to a production planning device, a production planning system, and a production planning method. The present invention claims priority to Japanese Patent Application No. 2021-125953 filed on Jul. 30, 2021, and for designated countries where incorporation by reference to documents is permitted, the content described in the application is incorporated herein by reference.

BACKGROUND ART

PTL 1 relates to a manufacturing system, and describes: "In a case where re-planning is instructed from a server according to determination that the execution condition of the re-planning is established, the production control measure re-plans a production plan using a production simulator and allocates the re-planned production plan to each production facility of a factory. As a result, even when a plan delay occurs, it is possible to maintain an optimum state without affecting the subsequent production plan."

CITATION LIST

Patent Literature

PTL 1: JP 2020-98541 A

SUMMARY OF INVENTION

Technical Problem

In a factory, when a production fluctuation event such as product changeover or facility failure occurs based on an analysis of productivity, it is necessary to prepare a countermeasure for solving the problem and to update a process plan, a work plan, and a production plan based on the countermeasure.

On the other hand, since such preparation of countermeasures or update of a production plan require manual work by a production manager or a production engineer of a factory based on operation data of productivity of the factory, there is a problem that productivity is hindered during a preparation period of countermeasures and the like, and it becomes difficult to flexibly deal with production fluctuations.

Note that PTL 1 discloses a technique of re-planning a production plan using a production simulator when a problem occurs. However, in the production system of PTL 1, only the production plan is re-planned, and the process plan or the work plan are not re-planned. That is, in the production system of PTL 1, since the problem is dealt with only by re-planning of the production plan without re-planning the process plan or the work plan, the range of countermeasure is limited, and as a result, a problem such as delay of the production plan may occur.

The present invention has been made in view of the above problems, and an object of the present invention is to update a process plan, a work plan, and a production plan with respect to a production fluctuation event in a short time and flexibly deal with the production fluctuation.

Solution to Problem

The present application includes a plurality of means for solving at least a part of the above problems, but examples thereof are as follows. A production planning device according to one aspect of the present invention that solves the above problem includes: a process plan generation unit which generates a plurality of process plans including an alternative process plan, the process plans relating to a production process of a product; a work plan generation unit which generates a work plan corresponding to each of the process plans; a production plan generation unit which generates a production plan using the plurality of process plans and the work plan; and a production plan redrafting unit which redrafts a production plan using the plurality of process plans and the work plan when a production fluctuation event occurs.

Advantageous Effects of Invention

According to the present invention, it is possible to update the process plan, the work plan, and the production plan with respect to the production fluctuation event in a short time and flexibly deal with the production fluctuation.

BRIEF DESCRIPTION OF DRAWINGS

FIG. 2 is a diagram illustrating an example of production performance information.

FIG. 4 is a diagram illustrating an example of component shape information.

FIG. 5 is a diagram illustrating an example of production quantity information.

FIG. 8 is a diagram illustrating an example of a work plan.

FIG. 9 is a diagram illustrating an example of a production plan.

DESCRIPTION OF EMBODIMENTS

Hereinafter, embodiments of the present invention will be described with reference to the drawings.

Figure 1:
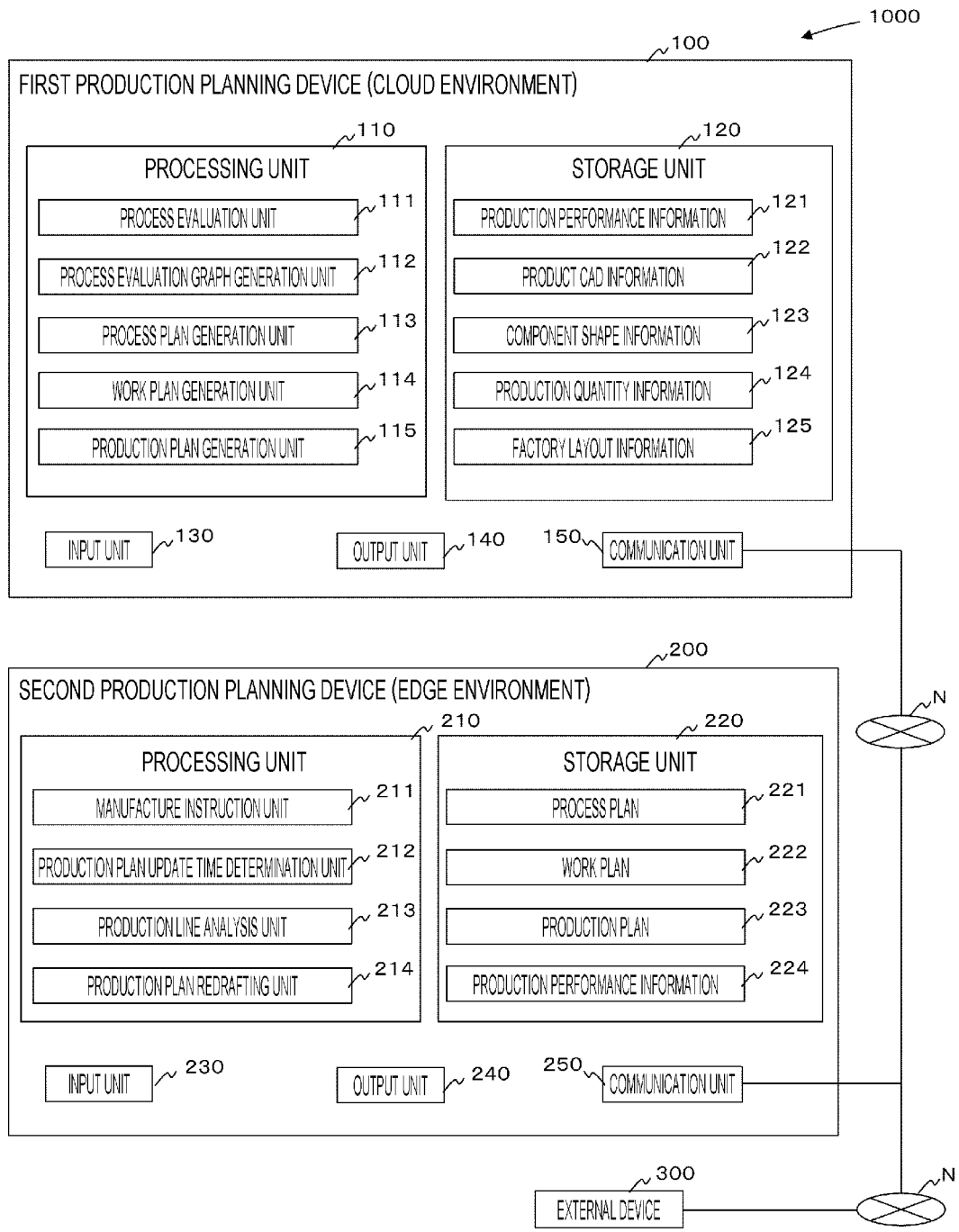
FIG. 1 is a diagram illustrating an example of a schematic configuration of a production planning system according to the present embodiment.

FIG. 1 is a diagram illustrating an example of a schematic configuration of a production planning system 1000 according to the present embodiment. As illustrated, the production planning system 1000 includes a first production planning device 100 and a second production planning device 200. In addition, the first production planning device 100 and the second production planning device 200 are communicably connected to each other via a network N such as a public network such as the Internet or a local area network (LAN) or a wide area network (WAN).

In addition, the first production planning device 100 and the second production planning device 200 are also communicably connected to an external device 300 used for transmitting an execution instruction of processing for these devices and information used for processing of each device via the network N.

The first production planning device 100 is a device which prepares a production plan for a product to be manufactured on a production line of a factory. The first production planning device 100 is realized by, for example, a server device placed in a cloud environment. The second production planning device 200 is a device which provides a manufacture instruction of a product to each facility forming a production line of a factory using the production plan acquired from the first production planning device 100. The second production planning device 200 is realized by, for example, a server device placed in an edge environment such as a factory.

In order to flexibly respond to the occurrence of the production fluctuation event, the first production planning device 100 generates in advance a plurality of process plans including an alternative process plan and a work plan corresponding to each process plan, and prepares a production plan using these plans. In addition, the first production planning device 100 transmits the production plan, the plurality of process plans including the alternative process plan, and the work plan corresponding to each process plan to the second production planning device 200.

The second production planning device 200 analyzes whether or not a production fluctuation event has occurred in accordance with the production line status of the factory, when it is determined to redraft the production plan, redrafts the production plan using the plurality of process plans and the work plan corresponding thereto acquired from the first production planning device 100, and provides a manufacture instruction to each facility based on the redrafted production plan.

Hereinafter, an example of each functional configuration of the first production planning device 100 and the second production planning device 200 will be described.

As illustrated in FIG. 1, the first production planning device 100 includes a processing unit 110, a storage unit 120, an input unit 130, an output unit 140, and a communication unit 150.

The processing unit 110 is a functional unit which executes various processing performed by the first production planning device 100. Specifically, the processing unit 110 includes a process evaluation unit 111, a process evaluation graph generation unit 112, a process plan generation unit 113, a work plan generation unit 114, and a production plan generation unit 115.

The process evaluation unit 111 is a functional unit which evaluates a work process of a component included in a target product. Specifically, the process evaluation unit 111 calculates an evaluation index (process evaluation index) of dimensional variations and work time variations of a component (including a similar component of the component). In addition, the process evaluation unit 111 calculates an operation rate of a facility used in a process of handling a component (including a similar component to the component).

The process evaluation graph generation unit 112 calculates an alternative process number reference value based on an evaluation index such as dimensional variations using a graph (hereinafter, may be referred to as a "work partial order graph") indicating a work partial order relationship of a product. Further, the process evaluation graph generation unit 112 generates a process evaluation graph in which the alternative process number reference value is assigned to a corresponding component or a node indicating a process.

The process plan generation unit 113 is a functional unit which generates a process plan. Specifically, the process plan generation unit 113 calculates the number of alternative processes of the corresponding process based on the alternative process number reference value. In addition, the process plan generation unit 113 generates a process plan (including an alternative process plan) using a set of each process and facility to which facilities of the number according to the number of alternative processes is allocated.

The work plan generation unit 114 is a functional unit which generates a work plan corresponding to each process plan.

The production plan generation unit 115 is a functional unit which generates a production plan using a process plan and a work plan.

The storage unit 120 is a functional unit which stores various types of information. Specifically, the storage unit 120 includes production performance information 121, product CAD (Computer-Aided Design) information 122, component shape information 123, production quantity information 124, and factory layout information 125.

FIG. 2 is a diagram illustrating an example of the production performance information 121. The production performance information 121 is information regarding past production performance. A product ID 121a of the production performance information 121 is information for identifying a product. A component ID 121b is information for identifying a component. A process ID 121c is information for identifying a process. A production resource ID 121d is information for identifying a production resource. A date and time 121e is information indicating an execution date and time of a predetermined process, for example, of assembling a component of the corresponding component ID 121b, or the like in production of a product identified by the corresponding product ID 121a. A start time 121f is information indicating a start time of a process identified by the corresponding process ID 121c. An end time 121g is information indicating an end time of the process.

When the process specified by the process ID 121c ends for a target specified by the product ID 121a and the component ID 121b, information regarding the target is registered and updated in such production performance information 121.

Figure 3:
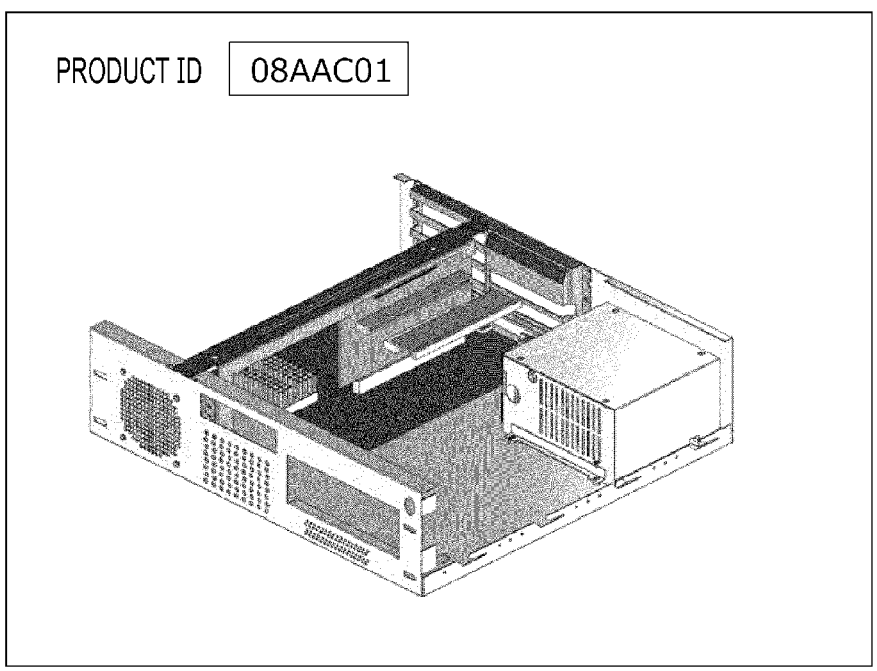
FIG. 3 is a diagram illustrating an example of product CAD information.

FIG. 3 is a diagram illustrating an example of the product CAD information 122. The product CAD information 122 includes information including a work partial order relationship of a component and other attribute information.

FIG. 4 is a diagram illustrating an example of the component shape information 123. The component shape information 123 is information regarding a shape of a component included in a product. Note that a component ID 123a of the component shape information 123 is information for identifying a component. A component name 123b is information indicating a name of a component. A shape characteristic 123c is information indicating a shape characteristic of a component such as a cylinder, a rectangle, or a column. Each of a width 123d, a length 123e, a diameter 123f, and a weight 123g is information indicating a width, a length, a diameter, and a weight of a component, respectively.

FIG. 5 is a diagram illustrating an example of the production quantity information 124. The production quantity information 124 is information regarding the quantity of a product or a component to be produced. A product ID 124a of the production quantity information 124 is information for identifying a product. A monthly production quantity 124*b* is information indicating the production quantity of the target product or a component in a predetermined target period.

Figure 6:
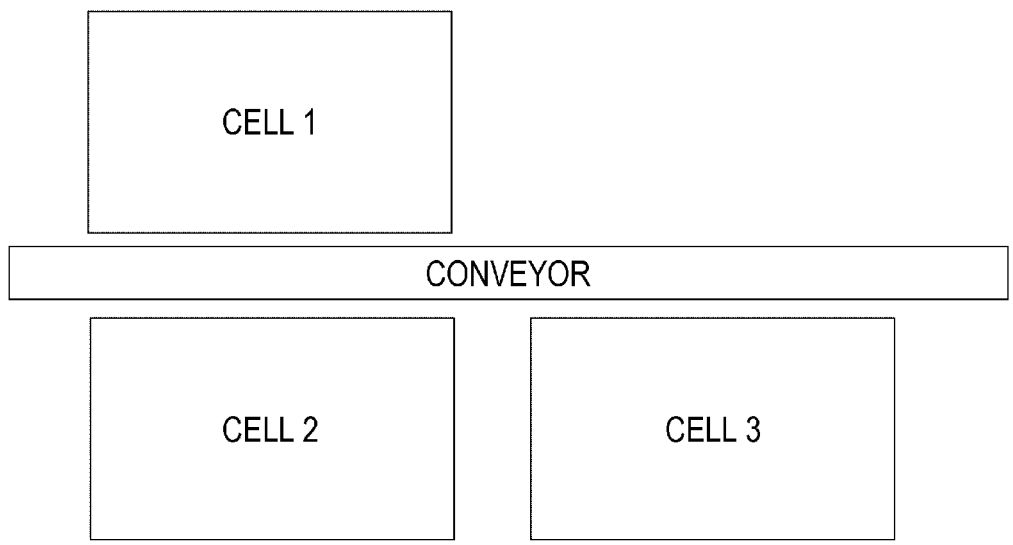
FIG. 6 is a diagram illustrating an example of factory layout information.

FIG. 6 is a diagram illustrating an example of the factory layout information 125. The factory layout information 125 is information indicating a position of an area (cell), a conveyor, or the like in a factory for arranging a facility.

Note that each information in the storage unit 120 may not be stored in the storage unit 120 in advance, and may be acquired from the external device 300 at the time of execution of processing in the first production planning device 100.

Returning to FIG. 1, the description will be given. The input unit 130 is a functional unit which receives an input of an instruction or information from an operator via an input device included in the first production planning device 100. Furthermore, the input unit 130 receives an input of an instruction or information from the second production planning device 200 or the external device 300 via the communication unit 150.

The output unit 140 is a functional unit which generates display information and displays the display information on a display device (display) included in the first production planning device 100 or the second production planning device 200 and the external device 300.

The communication unit 150 is a functional unit which performs information communication with the second production planning device 200 or the external device 300.

An example of the functional configuration of the first production planning device 100 has been described above.

As illustrated in FIG. 1, the second production planning device 200 includes a processing unit 210, a storage unit 220, an input unit 230, an output unit 240, and a communication unit 250.

The processing unit 210 is a functional unit which executes various processing performed by the second production planning device 200. Specifically, the processing unit 210 includes a manufacture instruction unit 211, a production plan update time determination unit 212, a production line analysis unit 213, and a production plan redrafting unit 214.

The manufacture instruction unit 211 is a functional unit which transmits a manufacture instruction to each facility in the factory. Specifically, the manufacture instruction unit 211 outputs an operation instruction (manufacture instruction) according to the work plan corresponding to the production plan generated by the first production planning device 100 to each facility in the factory via the communication unit 250, thereby executing production of a product.

The production plan update time determination unit 212 is a functional unit which determines an update time of the production plan. Specifically, the production plan update time determination unit 212 determines whether or not the time for reviewing the configuration of the production line or the time for drafting the production plan has arrived. Note that the information regarding these times may be stored in the storage unit 220 in advance.

The production line analysis unit 213 is a functional unit which analyzes the situation of the production line. Specifically, the production line analysis unit 213 acquires and analyzes information indicating the status of the production line from each facility in the factory connected via the communication unit 250.

The production plan redrafting unit 214 is a functional unit which redrafts the production plan. Specifically, the production plan redrafting unit 214 redrafts the production plan using the process plan and the work plan corresponding to each process plan acquired from the first production planning device 100.

The storage unit 220 is a functional unit which stores various types of information. Specifically, the storage unit 220 includes a process plan 221 including an alternative process plan acquired from the first production planning device 100, a work plan 222, a production plan 223, and production performance information 224.

Figure 7:
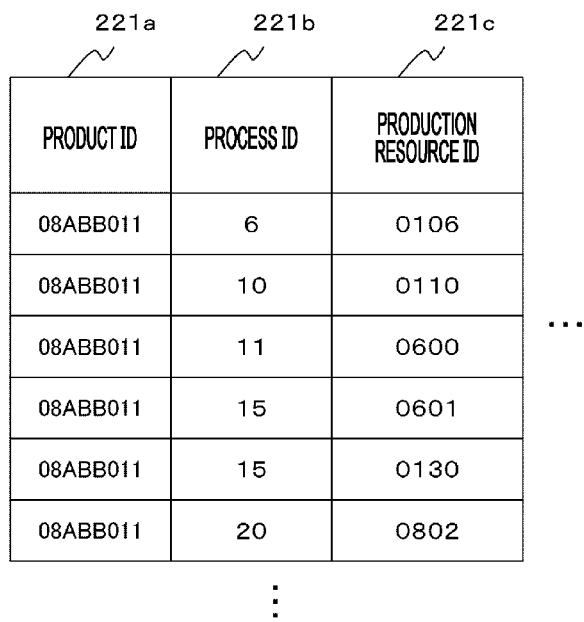
FIG. 7 is a diagram illustrating an example of a process plan.

FIG. 7 is a diagram showing an example of the process plan 221. In the process plan 221, information regarding a manufacturing process of a product is registered. A product ID 221*a* of the process plan is information for identifying the target product. A process ID 221*b* is information for identifying a process. A production resource ID 221*c* is information for identifying a production resource.

FIG. 8 is a diagram illustrating an example of the work plan 222. In the work plan 222, information indicating work contents performed in each process is registered. Note that a work ID 222*a* of the work plan 222 is information for identifying work, and is information associated with each process ID 221*b* of the process plan 221. A work plan ID 222*b* is information for identifying a work plan, and an ID indicating the contents (For example, assembling work and the like) of the work plan are registered. A work time 222*c* is information indicating a work time when the facility (production resource) allocated to the process specified by the work ID 222*a* executes the work contents specified by the work plan ID 222*b*.

It is assumed that a robot program for realizing work contents performed in each process is stored in the storage unit 120 in association with the work plan ID 222*b*. This robot program is generated according to each process plan based on a known technique using predetermined information (not illustrated) related to the arrangement and the like of a robot in a cell. Specifically, the robot program is generated by the work plan generation unit 114 using, for example, information regarding the arrangement pattern of cells in the factory (for example, information having a predetermined parameter value such as a position, a posture, and an operation speed of the robot). In addition, it is assumed that the work contents corresponding to the work plan ID 222*b* is registered in predetermined information (not illustrated) stored in the storage unit 120 in advance.

FIG. 9 is a diagram illustrating an example of the production plan 223. In the production plan 223, information related to a production plan of a product is registered. A product ID 223*a* of the production plan is information for identifying a product. A component ID 223*b* is information for identifying a component. A process ID 223*c* is information for identifying a process. A production resource information for identifying a production resource. A date and time 223*e* is information indicating an execution date and time of a predetermined process, for example, of assembling a component of the corresponding component 223*b*, or the like in production of a product identified by the corresponding product ID 223*a*. A scheduled start time 223*f* is information indicating a scheduled start time of the process identified by the corresponding process ID 223*c*. A scheduled end time 223*g* is information indicating a scheduled end time of the process.

Note that the production performance information 224 in the storage unit 220 is information common to the production performance information 121 stored in the storage unit 120 of the first production planning device 100, and is updated in accordance with manufacturing of a product based on the production plan.

In addition, since the input unit 230 and the output unit 240 are similar to those of the first production planning device 100, detailed description thereof will be omitted.

The communication unit 250 is a functional unit which performs information communication with the first production planning device 100 or the external device 300.

An example of the functional configuration of the second production planning device 200 has been described above.

[Description of Operation]

Figure 10:
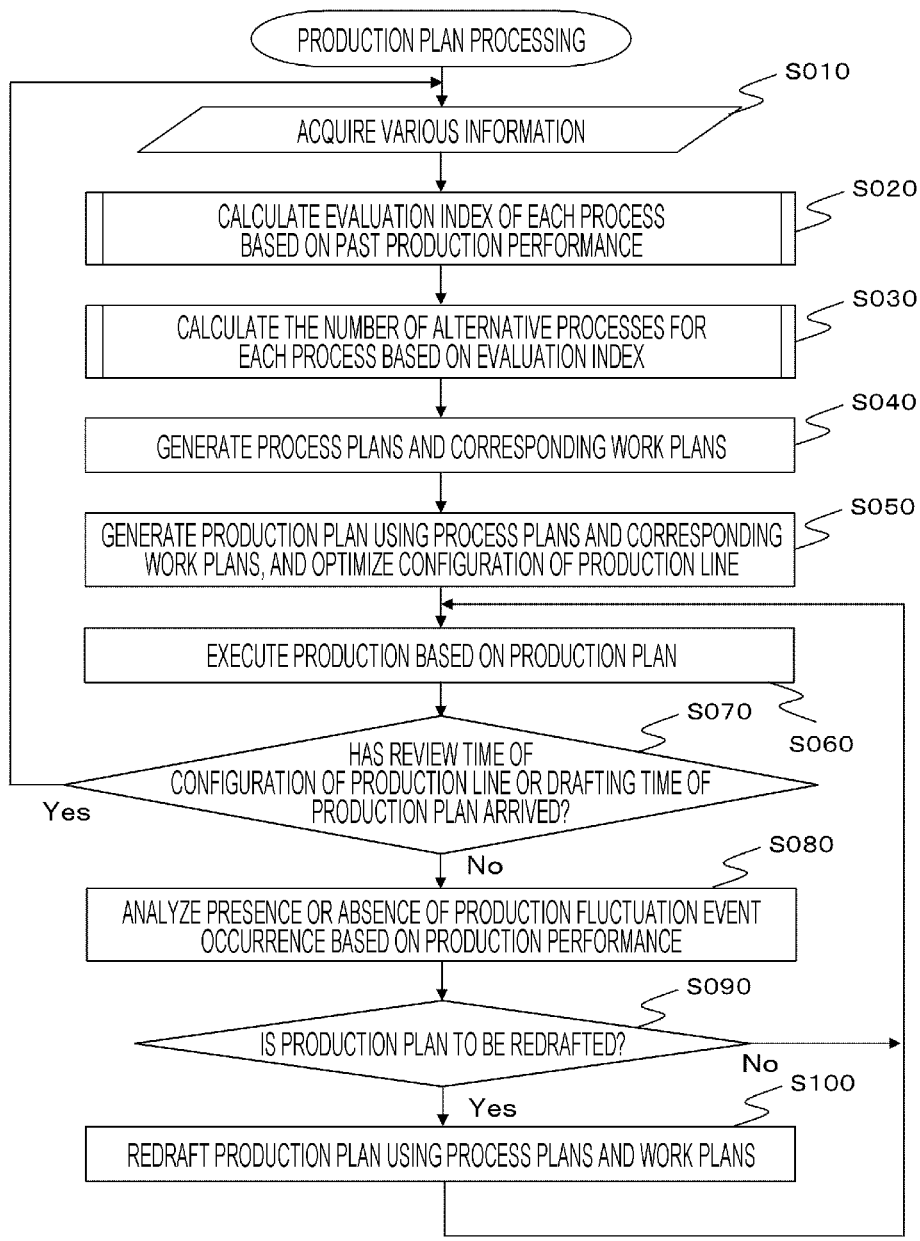
FIG. 10 is a flowchart illustrating an example of production plan processing.

FIG. 10 is a flowchart illustrating an example of production plan processing. As will be described later, in the production plan processing, the processing of step S010 to step S050 is executed by the first production planning device 100, and the processing of step S060 to step S100 is executed by the second production planning device 200. Note that the production plan processing is started, for example, when an execution instruction of the processing is received from a user via the input unit 130 in the first production planning device 100.

When the processing is started, the first production planning device 100 acquires various information (step S010). Specifically, the process evaluation unit 111 acquires the production performance information 121, the product CAD information 122, the component shape information 123, the production quantity information 124, and the factory layout information 125 from the storage unit 120.

Next, the process evaluation unit 111 calculates an evaluation index of each process based on the past production performance (step S020).

Figure 11:
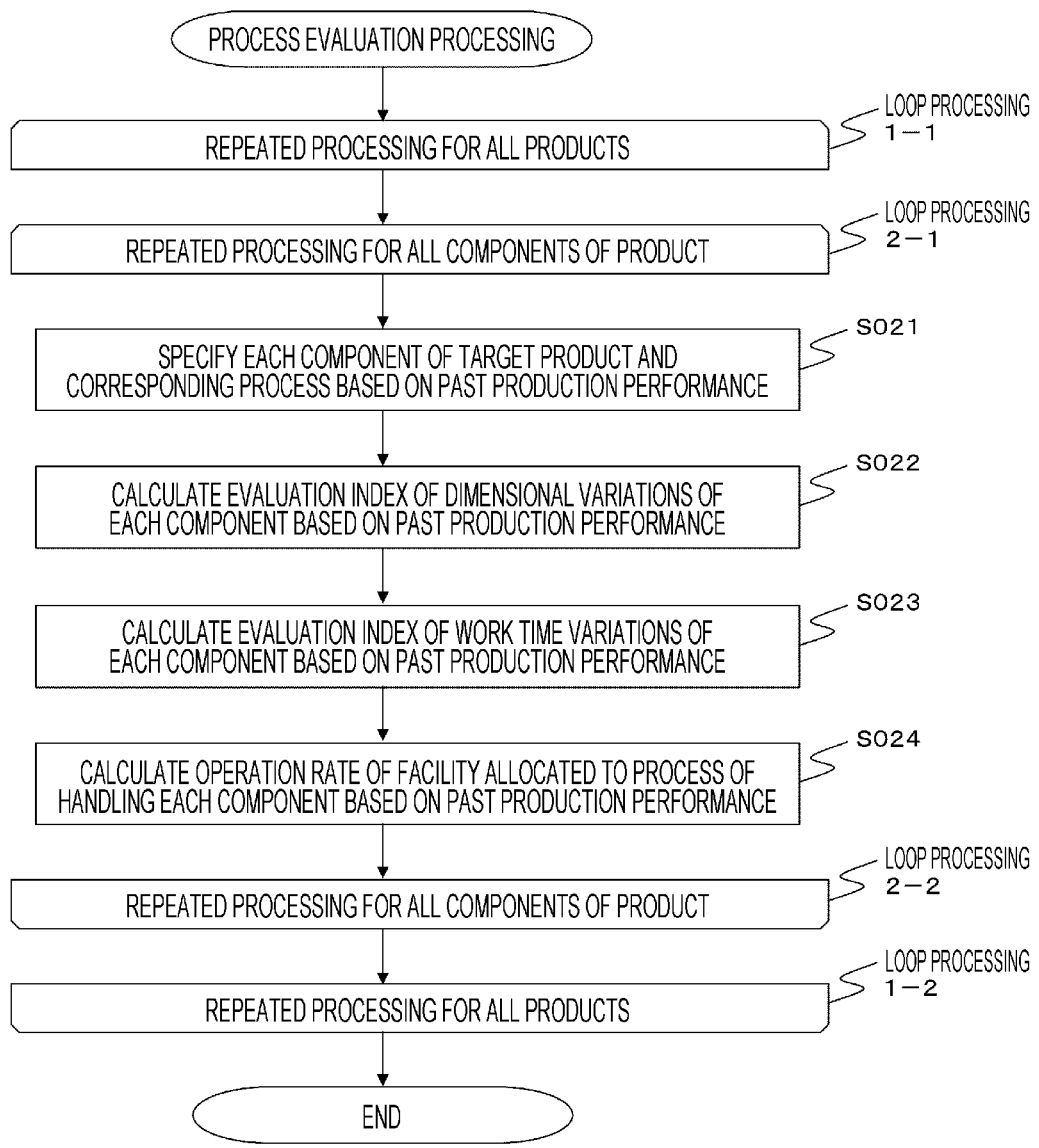
FIG. 11 is a flowchart illustrating an example of process evaluation processing.

FIG. 11 is a flowchart illustrating an example of corresponding to step S020. When such processing is started, the process evaluation unit 111 repeatedly executes the following processing in step S021 to step S024 for all the components of all the products (loop processing 1-1 to 1-2, loop processing 2-1 to 2-2).

In step S021, the process evaluation unit 111 specifies each component of a target product and a corresponding process based on past production performance. Specifically, the process evaluation unit 111 specifies each component of the target product and a corresponding process ID using the production performance information 121.

When the production performance of the target product is not included in the production performance information 121, the process evaluation unit 111 specifies a similar component which is similar to each component of the product and a corresponding process ID. Specifically, the process evaluation unit 111 triangularly meshes the target product using the product CAD information 122 and the component shape information 123, and divides the product into components based on the connection relationship between the meshes and the shape characteristics and size of the components. In addition, the process evaluation unit 111 specifies a component ID of a component having the same or similar shape characteristics and size from the component shape information 123, and specifies a process ID associated with the component ID from the production performance information 121.

As such processing, for example, a method similar to the process labeling processing described in Japanese Patent Application No. 2020-144537 may be used.

Next, the process evaluation unit 111 calculates an evaluation index of the dimensional variations of each component based on the past production performance (step S022). Specifically, the process evaluation unit 111 specifies the dimension of the specified component at the time of past production using, for example, predetermined information (not illustrated) in which the component ID and the dimension of the component are registered in association with each other. In addition, the process evaluation unit 111 obtains the standard deviation of the dimensional variations, and calculates an evaluation Cp of the dimensional variations of each component by an equation (1) below using the standard deviation of the dimensional variations, an UTL (upper tolerance limit value of the dimensional variations) and an LTL (lower tolerance limit value of the dimensional variations) which are constants. Note that σ represents a standard deviation of dimensional variations.

$$Cp = (UTL - LTL)/6\sigma \qquad \text{[Equation 1]}$$

Note that the process evaluation unit 111 may obtain the average value of the dimensional variations using the above-described predetermined information and calculate an evaluation index Cpk of the dimensional variations of each component by an equation (2) below. Note that in the equation, T=(UTL−LTL)/2, and μ represents an average value of dimensional variations.

$$Cpk = ((UTL - LTL) - 2|\mu - T|)/6\sigma \qquad \text{[Equation 2]}$$

Next, the process evaluation unit 111 calculates an evaluation index of work time variations of each component based on the past production performance (step S023). Specifically, the process evaluation unit 111 calculates the work time in the past production of a component based on the difference between the start time and the end time of the production performance information 121. In addition, the process evaluation unit 111 obtains the standard deviation of the work time variations, and calculates an evaluation index Tp of the work time variations of each component by an equation (3) below using the standard deviation of the work time variations and USL (upper tolerance limit value of work time variations) and LSL (lower tolerance limit value of work time variations) which are constants. Note that σ represents the standard deviation of the work time variations.

$$Tp = (USL - LSL)/6\sigma \qquad \text{[Equation 3]}$$

The process evaluation unit 111 may obtain the average value of the work time variations using the production performance information 121 and calculate an evaluation index Tpk of the work time variations of each component by an equation (4) below. Note that in the equation, S=(USL−LSL)/2, and ε represents an average value of work time variations.

$$Tpk = ((USL - LSL) - 2|\varepsilon - S|)/6\sigma \qquad \text{[Equation 4]}$$

Next, the process evaluation unit 111 calculates the operation rate of the facility allocated to the process of handling each component based on the past production performance (step S024). Specifically, the process evaluation unit 111 specifies a record of the production performance e information 121 in which the component ID of the component and the process ID are associated, and calculates the operation rate of the facility allocated to each process based on the difference between the start time and the end time of the record.

When the processing of step S024 is completed, the process evaluation unit 111 ends this flow.

Returning to FIG. 10, the description will be given. Next, the first production planning device 100 calculates the number of alternative processes for each process based on the evaluation index (step S030).

Figure 12:
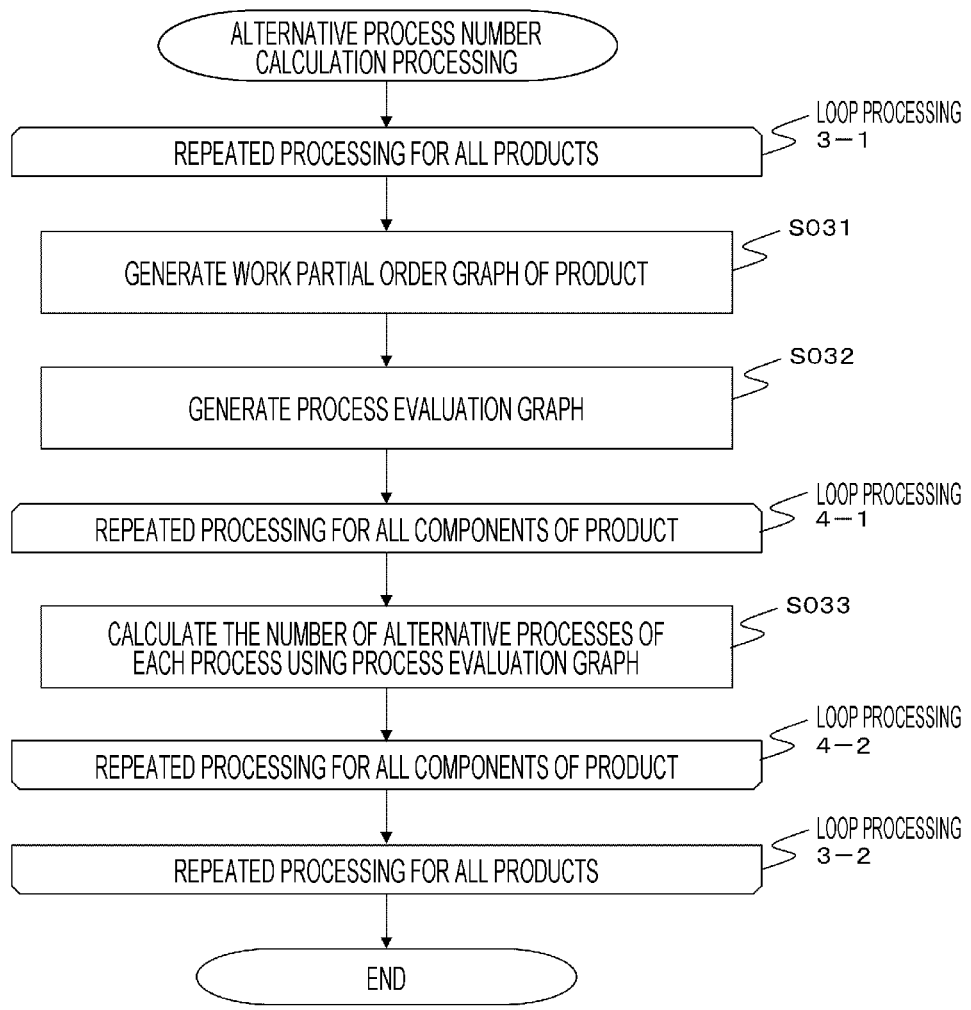
FIG. 12 is a flowchart illustrating an example of alternative process number calculation processing.

FIG. 12 is a flowchart illustrating an example of alternative process number calculation processing corresponding to step S030. When such processing is started, the process evaluation graph generation unit 112 repeatedly executes the following processing of step S031 to step S033 for all the products (loop processing 3-1 to 3-2).

In step S031, the process evaluation graph generation unit 112 generates a work partial order graph using the product CAD information 122.

Figure 13:
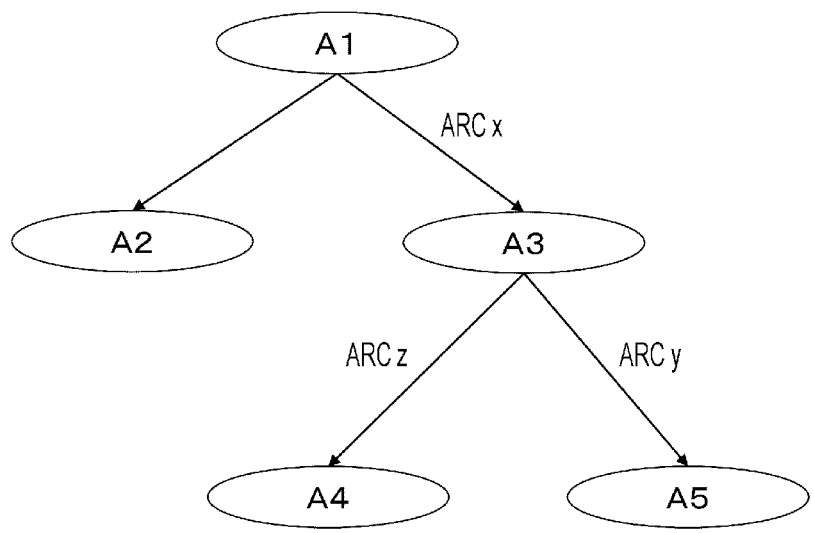
FIG. 13 is a diagram illustrating an example of a work partial order graph.

FIG. 13 is a diagram illustrating an example of the work partial order graph. As illustrated in the drawing, the work partial order graph includes nodes A1 to A5 indicating the components of the product and arcs indicating assembling relationships between the nodes, that is, the partial order relationships. Note that the node can also be defined as indicating a process of handling each component. Therefore, in the following description, a component and a process corresponding to the component may be described synonymously.

Next, the process evaluation graph generation unit 112 generates a process evaluation graph (step S032). Specifically, the process evaluation graph generation unit 112 calculates the attribute values of arcs for three attributes of "sum of evaluation indexes of dimensional variations", "sum of evaluation indexes of work time variations", and "sum of facility operation rates". Further, the process evaluation graph generation unit 112 clusters arcs having an attribute value equal to or greater than a predetermined reference value for each attribute.

First, the process evaluation graph generation unit 112 calculates the attribute value of the arc for the "sum of evaluation indexes of dimensional variations" among the attributes, and clusters the arcs having the attribute value equal to or greater than the reference value. Specifically, the process evaluation graph generation unit 112 assigns an evaluation index of the dimensional variations of the corresponding component to each node of the generated work partial order graph. Further, the process evaluation graph generation unit 112 calculates the sum of the evaluation indexes assigned to the nodes at both ends, that is, the sum of evaluation indexes of dimensional variations in the components at both ends as the attribute value of the arc between both the nodes.

Further, the process evaluation graph generation unit 112 compares the calculated attribute value of the arc with a predetermined reference value, and clusters the arcs equal to or greater than the reference value. As a result, a process (component) which is a node at both ends of the clustered arcs, has a large degree of dimensional variations, and is likely to cause a problem, and a process related to the process and is likely to be affected when the problem occurs are associated with each other by the clustered arcs.

In addition, the process evaluation graph generation unit 112 clusters the arcs for the attributes of "sum of evaluation indexes of work time variations" and "sum of facility operation rates" by a similar method.

Further, the process evaluation graph generation unit 112 aggregates the number $CN_i$ of arcs clustered in the connected arcs for each attribute of arc for a node i. Specifically, the process evaluation graph generation unit 112 adds $CN_i$ to a node connected to the clustered arcs for each attribute of arc. For example, in a case of the attribute "sum of evaluation indexes of dimensional variations", when an arc x and an arc y are clustered, the $CN_i$ of a node A3 is "2" obtained by adding the arc x=1 and the arc y=1. Furthermore, for example, in a case of the attribute "sum of evaluation indexes of work time variations", when arc x and an arc z are clustered, the $CN_i$ of the node 3 is "2" obtained by adding the arc x=1 and the arc z=1. In addition, in a case of the attribute "sum of facility operation rates", when the arc x, the arc y, and the arc z are clustered, the $CN_i$ of the node 3 is "3" obtained by adding the arc x=1, the arc y=1, and the arc z=1.

In addition, the process evaluation graph generation unit 112 generates a process evaluation graph by calculating the sum of the values aggregated for each attribute and providing the sum to each corresponding node as an alternative process number reference value.

Note that the process evaluation graph generation unit 112 only needs to generate the process evaluation graph using at least one or more attributes among the three attributes of the arcs, and it is not essential to use all of the three attributes.

Next, the process plan generation unit 113 repeatedly executes the processing of the following step S033 for all the components of the product (loop processing 4-1 to 4-2).

In step S033, the process plan generation unit 113 calculates the number of alternative processes of the process corresponding to the node using the process evaluation graph. Specifically, the process plan generation unit 113 calculates the number of alternative processes of the process corresponding to each node according to the ratio of the value of the alternative process number reference value of each node to the average value of the $CN_i$ of all nodes.

Note that the process plan generation unit 113 sets the number of alternative processes to "1" for a node to which an alternative process number reference value less than the average value of the $CN_i$ of all nodes is assigned. In this case, one facility is allocated to a process corresponding to such a node (each process has the number of basic facilities=1), and no other facility is allocated as an alternative process.

In addition, for example, for a node to which an alternative process number reference value equal to or greater than the average value of the $CN_i$ of all nodes is assigned, the process plan generation unit 113 calculates the number of alternative processes="2" to "n" according to the ratio of the value of the reference value. In this case, the number of facilities obtained by adding the number of basic facilities=1 and the calculated number of alternative processes is allocated to the process corresponding to the node.

When the process plan generation unit 113 calculates the number of alternative processes for each process for all the components of all the products, this flow ends.

Returning to FIG. 10, the description will be given. Next, the first production planning device 100 generates a plurality of process plans and corresponding work plans (step S040). A method of generating the process plan and the work plan is not particularly limited, but an example thereof will be described below.

First, the process plan generation unit 113 specifies component IDs of components corresponding to process and a component similar thereto based on the component shape information 123, and specifies production resources with which these component IDs are associated based on the production performance information 121.

In addition, the process plan generation unit 113 sets the plurality of specified production resources as candidates of the production resources of the process, and allocates, to the process, production resource candidates of the number according to the sum of the number of alternative processes calculated in step S030 and the number of basic facilities, and having a smaller work time of the process.

In addition, the process plan generation unit 113 generates a plurality of process plans in which production resource candidates of the number according to the number of alternative processes are allocated to each process corresponding to each component for each product by performing similar processing to all the components in all the target products.

As the method for generating such a process plan, for example, the technique described in Japanese Patent Application No. 2020-144537 may be used.

In addition, the process plan generation unit 113 generates a work plan in which a work ID associated with a process, a work plan ID indicating work contents, and a work time are associated for each generated process plan. The method of generating the work plan based on the process plan is not particularly limited, and a known technique may be used.

As another example of the method of generating the process plan, for example, the technique described in Japanese Patent Application No. 2020-030479 may be used. Specifically, the process plan generation unit 113 generates a plurality of sets of processes and facilities in which facilities (module groups) of the number according to the sum of the calculated number of alternative processes and the number of basic facilities are allocated to the corresponding process. In addition, the work plan generation unit 114 estimates the work time based on the arrangement of the facilities (module groups) in the cell in the factory layout, the operation rule, or the like. In addition, the process plan generation unit 113 specifies a predetermined number of sets of processes and facilities in which the work time in the cell becomes smaller, and generates a plurality of process plans in consideration of the work order of all the components in all the products. When a facility is allocated to a process, the required number of facilities in each process is determined accordingly. Therefore, the generated process plan includes the facility configuration of the production line indicated by the facility type used in the production line and the number thereof. In addition, the work plan generation unit 114 generates the work plan in which the work time of the facility in the cell is associated with each process included in the process plan for each generated process plan.

More specifically, the process plan generation unit 113 extracts facilities (module group candidates) of the number according to the sum of the number of alternative processes and the number of basic facilities for each process. In addition, the work plan generation unit 114 calculates the work time in consideration of the arrangement and orientation of each module group candidate in the cell and the operation rule. In addition, the process plan generation unit 113 specifies a predetermined number of module group candidates and arrangement plans in which the work time in the cell in the module group candidate unit becomes smaller. In addition, the process plan generation unit 113 generates a plurality of process plans in which the specified module group candidate is allocated to each corresponding process. In addition, the work plan generation unit 114 generates a work plan in which the corresponding work ID and the work time of the module group used for the process are associated with each process included in the generated process plan.

When the process plan is generated by such a method, the necessary information (for example, component attribute information, module group specification information, module specification information, module operation pattern information, layout information, and the like) may be stored in the storage unit 120 in advance, or may be acquired from the external device 300 via the communication unit 150.

Next, the production plan generation unit 115 generates a production plan using a plurality of process plans and work plans, and simultaneously optimizes the configuration of the production line (step S050). Specifically, the production plan generation unit 115 generates an optimized production plan, allocates a cell to each process, and calculates the number of cells by a metaheuristic method such as a mixed integer programming (MIP) solver, a genetic algorithm (GA), or the like so that the production throughput is maximized and the change cost of the cell configuration is equal to or less than the reference value using the generated process plan 221 and work plan 222, and the production quantity information 124, the factory layout information 125, or the like, for all the components of all the products. The change cost of the cell configuration may be stored in the storage unit 120 in advance.

After performing the processing of step S050, the production plan generation unit 115 transmits the generated production plan 223, a plurality of process plans (in this case, including a plurality of alternative process plans not related to the generated production plan) 221, and the work plan 222 corresponding to each process plan 221 to the second production planning device 200 via the communication unit 150.

Next, the second production planning device 200 executes production of a product based on the acquired production plan 223 (step S060). Specifically, the manufacture instruction unit 211 executes production of a product by providing a manufacture instruction to each facility in the factory using the work plan 222 corresponding to the production plan 223 via the communication unit 250. More specifically, the manufacture instruction unit 211 updates the operation program of each facility in the factory using the robot program associated with the work plan 222 corresponding to the production plan 223, so that the product is manufactured according to the production plan 223.

Next, the production plan update time determination unit 212 determines whether or not the review time of the configuration of the production line or the drafting time of the production plan has arrived (step S070).

Then, when it is determined that any time has arrived (Yes in step S070), the production plan update time determination unit 212 returns the processing to step S010. In this case, the production plan update time determination unit 212 transmits an instruction request regarding drafting of the production plan to the first production planning device 100 via the communication unit 250. On the other hand, when it is determined that any time has not arrived (No in step S070), the production plan update time determination unit 212 proceeds to the processing of step S080.

In step S080, the production line analysis unit 213 analyzes whether or not a production fluctuation event has occurred based on the production performance. Specifically, the production line analysis unit 213 compares the production performance information 121 sequentially updated with the production of the product with the production plan 223, and analyzes whether or not there is a delay in the production of the product with respect to the production plan 223. In addition, the production line analysis unit 213 analyzes whether or not error information indicating failure is output from each facility via the communication unit 250.

Next, the production line analysis unit 213 determines whether or not to redraft the production plan (step S090). Specifically, the production line analysis unit 213 determines to redraft the production plan when a delay of a predetermined threshold or more occurs in the production performance with respect to the production plan 223 or when error information is output from a facility.

Then, when it is determined that the production plan is not to be redrafted (No in step S090), the production line analysis unit 213 returns the processing to step S060. On the other hand, when it is determined that the production plan is to be redrafted (Yes in step S090), the production line analysis unit 213 proceeds to the processing of step S100.

In step S100, the production plan redrafting unit 214 re-plans (redrafts) the production plan using the plurality of process plans 221 acquired from the first production planning device 100 and the work plan 222 corresponding to each process plan 221.

Specifically, the production plan redrafting unit 214 redrafts the optimized production plan and allocates a cell to each process by a metaheuristic method such as the mixed integer programming (MIP) solver or the genetic algorithm (GA) so that a predetermined key performance indicator (KPI) regarding productivity such as maximization of a production throughput and minimization of a delivery date delay is maximized using the plurality of process plans 221 and the corresponding work plans 222, the production quantity information 124, and the like.

After performing the processing of step S100, the production plan redrafting unit 214 returns the processing to step S060. In this case, the manufacture instruction unit 211 provides a manufacture instruction to each facility based on the robot program associated with the redrafted production plan and the corresponding work plan.

The production plan processing according to the present embodiment has been described above.

According to such a production planning system, the process plan, the work plan, and the production plan can be updated in a short time with respect to the production fluctuation event, and it is possible to deal with the production fluctuation flexibly. In particular, in the production planning system, a plurality of process plans including alternative process plans and work plans corresponding to the respective process plans are generated in advance in the first production planning device, and in a case where a production fluctuation event occurs in a factory, a production plan in which a predetermined KPI regarding productivity such as a production throughput is optimized is redrafted using the plurality of process plans and the work plans, and a manufacture instruction is provided to each facility based on the corresponding work plan. Therefore, according to the production planning system, it is possible to update the production plan without requiring manpower, and it is possible to realize production flexible to production fluctuation.

In addition, according to the first production planning device, it is possible to quantitatively evaluate dimensional variations and work time variations of components by using the process evaluation index, and to generate more alternative processes (allocation of facilities) for a process in which a problem (for example, the work delay or the work redone) is likely to occur or a process in which the process is likely to be affected by the problem.

In addition, according to the first production planning device, it is possible to quantitatively evaluate the facility operation rate and generate more alternative processes (facility assignment) for a process using facility with a high operation rate. As a result, it is possible to generate a process using facility with a relatively low operation rate as an alternative process, and thus, it is possible to suppress the occurrence of work delay even when a failure occurs in facility with a high operation rate.

In addition, according to the production planning system, a plurality of process plans including an alternative process plan, a work plan (including a robot program), and a production plan are generated by a first production planning device placed in a cloud environment, and when production fluctuation occurs, a second production planning device placed in an edge environment such as a factory redrafts the production plan using the alternative process plan and the corresponding work plan. Therefore, even in a situation where a problem occurs in the cloud environment and the first production planning device cannot be used, the second production planning device in the edge environment can deal with production fluctuation, and product manufacturing can be continued.

Note that there may be a plurality of second production planning devices 200, and the first production planning device 100 may simultaneously generate a plurality of process plans 221, corresponding work plans 222, and production plans 223 to be transmitted to the plurality of second production planning devices 200.

In addition, in the production planning system according to the first modification of the present invention, the second production planning device 200 may have each information in the processing unit and the storage unit included in the first production planning device 100. In this case, instead of the first production planning device 100, the second production planning device 200 in the edge environment may generate the plurality of process plans 221, the work plan 222, and the production plan 223, and provide a manufacture instruction to each facility using the production plan 223 and the work plan 222 to produce the product.

In addition, in the production planning system according to the second modification of the present invention, the first production planning device 100 may have each information in the processing unit and the storage unit included in the second production planning device 200. In this case, instead of the second production planning device 200, the first production planning device 100 in the cloud environment provides a manufacture instruction to each facility connected via the communication unit 150, based on the production plan 223 and the work plan 222. In addition, the first production planning device 100 redrafts the production plan using the plurality of process plans 221 and the work plan 222 according to the occurrence of the production fluctuation event.

In addition, in the production planning system according to the third modification of the present invention, the first production planning device 100 according to the second modification and the second production planning device 200 according to the first modification may coexist. That is, a production planning device having the same configuration capable of generating the production plan 223 using the plurality of process plans 221 and the work plans 222 and redrafting the production plan 223 using the alternative process plan 221 and the corresponding work plan 222 when the production fluctuation event occurs may coexist in the cloud environment and the edge environment.

With such a configuration of the second production planning device or the first production planning device, it is also possible to update the process plan, the work plan, and the production plan with respect to the production fluctuation event in a short time and flexibly deal with the production fluctuation.

Next, an example of a hardware configuration of the first production planning device 100 will be described. Note that the hardware configuration of the second production planning device 200 is similar to that of the first production planning device 100, and thus detailed description thereof will be omitted.

Figure 14:
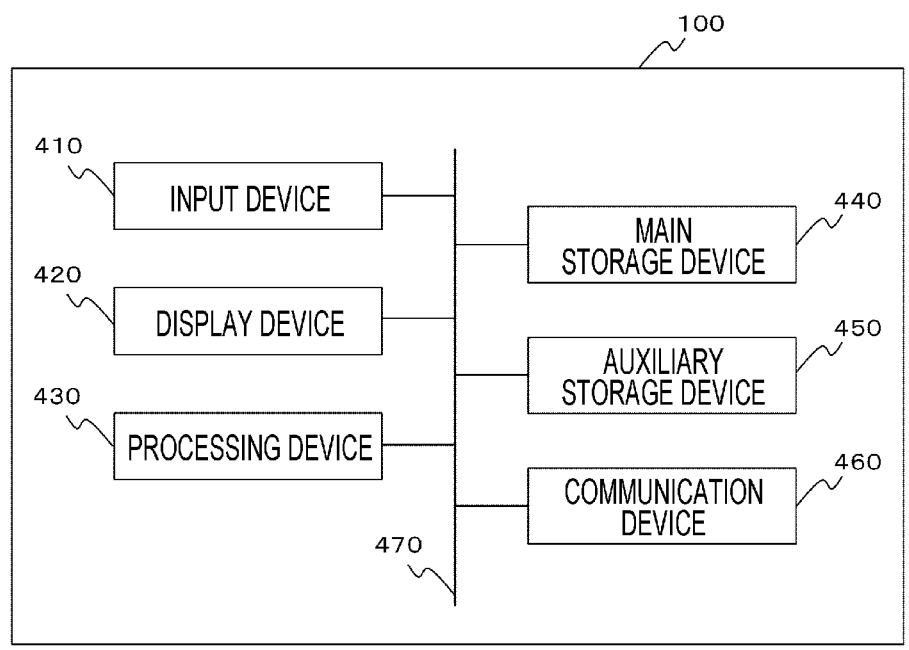
FIG. 14 is a diagram illustrating an example of a hardware configuration of a first production planning device.

FIG. 14 is a diagram illustrating an example of the hardware configuration of the first production planning device 100. As illustrated, the first production planning device 100 includes an input device 410, a display device 420, a processing device 430, a main storage device 440, an auxiliary storage device 450, a communication device 460, and a bus 470 that electrically interconnects these devices.

The input device 410 is an input device such as a touch panel, a keyboard, or a mouse. The display device 420 is a display device such as a liquid crystal display or an organic display.

The processing device 430 is, for example, a central processing unit (CPU). The main storage device 440 is a memory device such as a random access memory (RAM) or a read only memory (ROM).

The auxiliary storage device 450 is a non-volatile storage device such as a so-called hard disk drive (hard disk drive), a solid state drive (SSD), or a flash memory capable of storing digital information.

The communication device 460 is a wired communication device which performs wired communication via a network N cable or a wireless communication device which performs wireless communication via an antenna.

An example of the hardware configuration of the first production planning device 100 has been described above.

The processing unit 110 of the first production planning device 100 as described above is realized by a program which causes the processing device 430 to perform processing. This program is stored in the main storage device 440 or the auxiliary storage device 450, loaded on the main storage device 440 when the program is executed, and executed by the processing device 430.

In addition, the input unit 130 is realized by the input device 410. In addition, the output unit 140 is realized by the display device 420. In addition, the storage unit 120 is realized by the main storage device 440, the auxiliary storage device 450, or a combination thereof. In addition, the communication unit 150 is realized by the communication device 460.

Note that hardware for realizing each of the processing unit 210, the input unit 230, the output unit 240, the storage unit 220, and the communication unit 250 of the second production planning device 200 is similar to that of the first production planning device 100.

In addition, a part or all of the above-described configurations, functions, processing units, processing means, and the like of the first production planning device 100 and the second production planning device 200 may be realized by hardware, for example, by designing with an integrated circuit or the like. In addition, each of the above-described configurations and functions may be realized by software by a processor interpreting and executing a program for realizing each function. Information such as a program, a table, and a file for realizing each function can be stored in a storage device such as a memory, a hard disk, and an SSD or a recording medium such as an IC card, an SD card, and a DVD.

In addition, the present invention is not limited to the above-described embodiments and modifications, and various modifications are included within the scope of the same technical idea. For example, the above-described embodiments have been described in detail in order to simply describe the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is also possible to add, delete, and replace other configurations for a part of the configuration of each embodiment.

In addition, the control lines and the information lines indicate those necessary for the description, and do not necessarily indicate all the control lines and the information lines on the product. In practice, it may be considered that almost all the configurations are connected to each other.

REFERENCE SIGNS LIST 1000 production planning system
100 first production planning device
110 processing unit
111 process evaluation unit
112 process evaluation graph generation unit
113 process plan generation unit
114 work plan generation unit
115 production plan generation unit
120 storage unit
121 production performance information
122 product CAD information
123 component shape information
124 production quantity information
125 factory layout information
130 input unit
140 output unit
150 communication unit
200 second production planning device
210 processing unit
211 manufacture instruction unit
212 production plan update time determination unit
213 production line analysis unit
214 production plan redrafting unit
220 storage unit
221 process plan
222 work plan
223 production plan
224 production performance information
230 input unit
240 output unit
250 communication unit
300 external device
410 input device
420 display device
430 processing device
440 main storage device
450 auxiliary storage device
460 communication device
470 bus
N network

The invention claimed is:

1. A production planning device configured to solve production fluctuations by flexibly and timely updating a plurality of process plans to avoid hindering productivity of at least one facility of a plurality of facility candidates, the production planning device comprising a memory coupled to at least one processor executing computer code for one or more units stored on the memory, the production planning device comprising:
- a process plan generation unit of the one or more units that generates the plurality of process plans including an alternative process plan, the plurality of process plans relating to a production process of a product;
- a work plan generation unit of the one or more units that generates a work plan corresponding to each of the plurality of process plans;
- a production plan generation unit of the one or more units that generates a production plan using the plurality of process plans and the work plan; and
- a production plan redrafting unit of the one or more units that redrafts the production plan using the plurality of process plans and the work plan when a production fluctuation event of the production fluctuations occurs; and
- a process evaluation unit of the one or more units that:
  - calculates a predetermined process evaluation index for the production process,
  - performs an evaluation of the production process for a predetermined attribute based on the predetermined process evaluation index,
  - calculates a number of facility candidates to be allocated to the production process based on the evaluation of the production process,
  - generates the plurality of process plans based on the plurality of facility candidates,
  - controls a robot via an operation program at each facility of the plurality of facility candidates by providing one or more plans of the plurality of process plans to update the operation program at each facility.

2. The production planning device according to claim 1, wherein the process evaluation unit calculates the predetermined process evaluation index utilizing dimensional variations of a component corresponding to the production process.

3. The production planning device according to claim 1, wherein the process evaluation unit calculates the predetermined process evaluation index utilizing work time variations in the production process.

4. The production planning device according to claim 1, wherein the process evaluation unit calculates an operation rate of a facility allocated to the production process, and
wherein the process plan generation unit evaluates the production process for a predetermined attribute based on the operation rate of the facility, calculates a number of facility candidates to be allocated to the production process based on the evaluation, and generates the plurality of process plans based on a set of the production process and the facility candidates of a number according to the number of facility candidates.

5. The production planning device according to claim 1, further comprising:
- a communication unit which transmits the plurality of process plans, the work plan, and the production plan to a predetermined device which outputs a manufacture instruction to a predetermined facility based on the production plan and the work plan.

6. The production planning device according to claim 5, wherein the predetermined device includes a production plan redrafting unit which redrafts a production plan using the plurality of process plans and the work plan in a case where a production fluctuation event occurs.

7. The production planning device according to claim 6, wherein the predetermined device includes a production line analysis unit which analyzes a situation of a production line using the production plan and an updated production performance, and
the production plan redrafting unit determines necessity of redrafting of a production plan based on an analysis result by the production line analysis unit.

8. The production planning device according to claim 1, further comprising a production line analysis unit which analyzes a situation of a production line using the production plan and an updated production performance,
wherein the production plan redrafting unit determines necessity of redrafting of a production plan based on an analysis result by the production line analysis unit.

9. The production planning device according to claim 1, wherein the production planning device generates in advance of the plurality of process plans including the alternative process plan and the work plan corresponding to each of the plurality of process plans.

10. The production planning device according to claim 1, wherein the production planning device analyzes that the production fluctuations have in accordance with a production line status of a factory, redrafts the production plan using the plurality of process plans and the work plan corresponding to the production line status and the production fluctuation event to provide a redrafted production plan, and generates and outputs a manufacture instruction to the facility based on the redrafted production plan.

11. The production planning device according to claim 1, wherein the production planning device compares production performance information sequentially updated with a production of the product to determine whether there is a delay in the production plan of the product.

12. The production planning device according to claim 1, wherein the production planning device compares production performance information sequentially updated with a production of the product to determine whether error information indicating failure is output from the facility.

13. The production planning device according to claim 1, wherein the production planning device comprises a control unit for providing the one or more plans to each facility.

14. A production planning system configured to solve production fluctuations by flexibly and timely updating a plurality of process plans to avoid hindering productivity of at least one facility of a plurality of facility candidates, including a first production planning device and a second production planning device, the first production planning device comprising a first memory coupled to at least one first processor executing computer code for one or more first units stored on the first memory, and the first production planning device comprising:
- a process plan generation unit of the one or more first units that generates the plurality of process plans including an alternative process plan, the plurality of process plans relating to a production process of a product;
- a work plan generation unit of the one or more first units that generates a work plan corresponding to each of the plurality of process plans;
- a production plan generation unit of the one or more first units that generates a production plan using the plurality of process plans and the work plan;
- a production plan redrafting unit of the one or more first units that redrafts the production plan using the plurality of process plans and the work plan when a production fluctuation event of the production fluctuations occurs;

a process evaluation unit of the one or more units that:
 calculates a predetermined process evaluation index for the production process,
 performs an evaluation of the production process for a predetermined attribute based on the predetermined process evaluation index,
 calculates a number of facility candidates to be allocated to the production process based on the evaluation of the production process,
 generates the plurality of process plans based on the plurality of facility candidates, and
 controls a robot via an operation program at each facility of the plurality of facility candidates by transmitting one or more plans of the plurality of process plans to the second production planning device thereby updating the operation program at each facility; and a communication unit of the one or more first units that transmits the plurality of process plans, the work plan, and the production plan to the second production planning device, and the second production planning device manufacturing a product using the production plan and the work plan acquired from the first production planning device.

15. A production planning method performed by a production planning device to solve production fluctuations by flexibly and timely updating a plurality of process plans to avoid hindering productivity of at least one facility of a plurality of facility candidates, the production planning device comprising a memory coupled to at least one processor executing computer code for one or more units stored on the memory, the production planning method comprising:

generating the plurality of process plans including an alternative process plan, the plurality of process plans relating to a production process of a product;

generating a work plan corresponding to each plan of the plurality of process plans;

generating a production plan using the plurality of process plans and the work plan;

redrafting the production plan using the plurality of process plans and the work plan when a production fluctuation event of the production fluctuations occurs;

calculating a predetermined process evaluation index for the production process, performing an evaluation of the production process for a predetermined attribute based on the predetermined process evaluation index, calculating a number of facility candidates to be allocated to the production process based on the evaluation of the production process, generating the plurality of process plans based on the plurality of facility candidates, and controlling a robot via an operation program at each facility of the plurality of facility candidates by providing one or more plans of the plurality of process plans to update the operation program at each facility.

\* \* \* \* \*